United States Patent
Haba et al.

(10) Patent No.: US 9,262,300 B1
(45) Date of Patent: Feb. 16, 2016

(54) DEBUGGING COMPUTER PROGRAMMING CODE IN A CLOUD DEBUGGER ENVIRONMENT

(71) Applicant: Google Inc., Mountain View, CA (US)

(72) Inventors: Erez Haba, Redmond, WA (US); Emre Kultursay, Seattle, WA (US); Vladimir Lifliand, Sammamish, WA (US); Amnon Omri Horowitz, Bellevue, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/662,282

(22) Filed: Mar. 19, 2015

Related U.S. Application Data (60) Provisional application No. 62/016,305, filed on Jun. 24, 2014.

(51) Int. Cl.
*G06F 9/44* (2006.01)
*G06F 11/36* (2006.01)

(52) U.S. Cl.
CPC .................................. *G06F 11/362* (2013.01)

(58) Field of Classification Search
USPC ................................. 717/123–130, 140–141
IPC .......................... G06F 11/362,11/3664, 11/3668
See application file for complete search history.

(56) References Cited

U.S. PATENT DOCUMENTS

| | | | | |
|---|---|---|---|---|
| 5,764,989 A * | 6/1998 | Gustafsson | ............... | G06F 8/48 714/E11.21 |
| 6,016,474 A * | 1/2000 | Kim | ................... | G06F 11/3664 709/224 |
| 6,543,049 B1 * | 4/2003 | Bates | ................. | G06F 11/3664 714/E11.21 |
| 7,039,831 B2 * | 5/2006 | Phillips | ............... | G06F 11/3656 712/227 |
| 7,185,321 B1 * | 2/2007 | Roe | .................... | G06F 11/3664 712/227 |
| 7,568,186 B2 * | 7/2009 | Bhattacharya | ...... | G06F 11/3636 717/124 |
| 7,581,211 B2 * | 8/2009 | Babineau | ............ | G06F 11/3636 717/129 |
| 7,669,186 B2 * | 2/2010 | Nolan | ................... | G06F 11/362 717/124 |
| 8,327,337 B2 * | 12/2012 | Barsness | ............... | G06F 11/362 714/38.1 |
| 8,336,032 B2 * | 12/2012 | Bates | .................. | G06F 11/3644 717/129 |
| 8,584,104 B2 * | 11/2013 | Gibbons et al. | ............... | 717/140 |
| 8,869,113 B2 * | 10/2014 | Li et al. | ......................... | 717/124 |

(Continued)

OTHER PUBLICATIONS

Armbrust et al, "A View of Cloud Computing" Communications of the ACM, vol. 53, No. 4, pp. 50-58, 2010.*
Mega et al, "Debugging Distributed Object Applications With the Eclipse Platform", ACM, 42-46, 2004.*

(Continued)

*Primary Examiner* — Anil Khatri
(74) *Attorney, Agent, or Firm* — Honigman Miller Schwartz and Cohn LLP (57) ABSTRACT

A method for capturing breakpoint information from a debuggee software process includes generating a breakpoint condition based upon a breakpoint request received from a user computing device corresponding to a user and transmitting the generated breakpoint condition to debuglets, each corresponding to a software process executed by a debuggee service. The debuggee service executes on a distributed system, and each debuglet translates the generated breakpoint condition to a physical breakpoint condition set to the respective software process. The method also includes receiving a request from one of the debuglets to update active breakpoint information captured by the debuglet upon the physical breakpoint condition being hit by one of the software processes and transmitting a notification from the processing device indicating the physical breakpoint condition being hit to the user computing device.

18 Claims, 6 Drawing Sheets

(56) References Cited

U.S. PATENT DOCUMENTS

| | | | |
|---|---|---|---|
| 8,909,990 B2 * | 12/2014 | Davis et al. | 714/37 |
| 8,924,940 B2 * | 12/2014 | Branson et al. | 717/128 |
| 8,972,953 B2 * | 3/2015 | Tamm | 717/129 |
| 9,015,676 B2 * | 4/2015 | Bates | G06F 11/362 717/127 |

OTHER PUBLICATIONS

Berg et al, " Optimal Predictive Code Offloading", ACM, pp. 1-10, 2014.*

Jaghoori et al,"User-Oriented Partial Result Evaluation in Workflow-based Science Gateways", IEEE, pp. 70-81, 2014.*

* cited by examiner

DEBUGGING COMPUTER PROGRAMMING CODE IN A CLOUD DEBUGGER ENVIRONMENT

CROSS REFERENCE TO RELATED APPLICATIONS

This U.S. patent application claims priority under 35 U.S.C. §119(e) to U.S. Provisional Application 62/016,305, filed on Jun. 24, 2014, which is hereby incorporated by reference in its entirety.

TECHNICAL FIELD

This disclosure relates to debugging computer programming code stored in a networking cloud.

BACKGROUND

A conventional development cycle for computer software code includes repeated steps of authoring, testing, debugging and modifying the code during initial development phases or long after deployment of the product. Traditional debugger tools, however, are generally ineffective for debugging computer software code developed on distributed systems, such as the cloud environment. As a result, developers resort to printf debugging or no debugging at all. This lack of debugging capabilities on distributed systems leads to increased time spent fixing problems as they occur or preventing them in the first place.

Known debuggers are primarily directed toward process state debugging rather than distributed service debugging. Developers on the cloud environment have an increased need to debug their services or requests, rather than simply debug a specific software process or thread. Developers generally debug software processes on distributed systems by collecting monitoring and tracking information to draw conclusions. This process can take minutes to days to carry out. The product is only pushed back to production once it has been fixed. In fact, most available debugging tools are directed toward achieving the highest fidelity by resolving every aspect of symbols, variables and memory while the software process is stopped. Thus, live debugging of the process cannot be achieved because the software process must be stopped to perform the debugging.

SUMMARY

One aspect of the disclosure provides a method for capturing a breakpoint condition from a debuggee software process. The method includes generating, at a processing device, a breakpoint condition based upon a breakpoint request received from a user computing device corresponding to a user. The method also includes transmitting the generated breakpoint condition from the processing device to debuglets, each corresponding to a software process executed by a debuggee service executing on a distributed system. Each debuglet translates the generated breakpoint condition to a physical breakpoint condition set to the respective software process. The method further includes receiving, at the processing device, a request from one of the debuglets to update active breakpoint information captured by the debuglet upon the physical breakpoint condition being hit by one of the software processes. The method further includes transmitting a notification from the processing device indicating the physical breakpoint condition being hit to the user computing device.

Implementations of the disclosure may include one or more of the following optional features. In some implementations, prior to generating the breakpoint condition based upon the breakpoint request, the method may include receiving, at the processing device, a user identifier included with the breakpoint request. The method may further include authorizing, at the processing device, user access rights to capture the active breakpoint information from the debuggee software processes using the user identifier.

In some examples, the execution of the respective software process that hit the physical breakpoint condition is stopped for only a period of time sufficient for the respective debuglet to capture the active breakpoint information. Execution of the respective software process may be immediately resumed after the active breakpoint information is captured.

In some implementations, each debuglet translates the generated breakpoint condition to a specific programming language and executable associated with the respective software process. Each of the debuglets may be dependent upon the programming language of their respective software process.

In some examples, receiving the request from one of the debuglets to update active breakpoint information further includes receiving breakpoint information (e.g., a call stack and/or variables) corresponding to the physical breakpoint condition being hit. Additionally or alternatively, one of the debuglets may translate the breakpoint information prior to transmittance to the processing device.

The method may further include a notification transmitted to the remaining debuglets that did not capture the active breakpoint information indicating the physical breakpoint condition being hit. The remaining debuglets may remove the physical breakpoint from the respective debuggee software processes in response to the notification. The method may further include storing the breakpoint condition and the captured active breakpoint information in non-transitory memory.

Another aspect of the disclosure provides a system for capturing a breakpoint condition from a debuggee software process. The system includes one or more debugger service processing devices executing a debugger service and one or more debuglet controller processing devices in communication with the one or more debugger service processing devices and executing the debuglet controller. The debugger service generates a breakpoint condition based upon a breakpoint request received from a user computing device in communication with the distributed system and corresponding to a user. The debuglet controller transmits the generated breakpoint condition to debuglets, each corresponding to a software process executed by a debuggee service executing on the distributed system. Each debuglet translates the generated breakpoint condition to a physical breakpoint condition set to the respective software process. The system also includes receiving a request from one of the debuglets to update active breakpoint information captured by the debuglet upon the physical breakpoint condition being hit by one of the software processes. The system further includes transmitting a notification indicating the physical breakpoint condition being hit to the user computing device.

In some implementations, the debuglet controller stops execution of only the respective software process that hit the physical breakpoint condition only for a period of time sufficient for the respective debuglet to capture the active breakpoint information. In some examples, the debuglet controller resumes execution of the respective software process immediately after the active breakpoint information is captured.

Prior to generating the breakpoint condition, the debugger service may receive a user identifier included with the breakpoint request and authorize user access rights to capture the active breakpoint information from the debuggee software processes using the identifier. In some implementations, the system includes a breakpoint store in communication with the one or more debugger service processing devices and the one or more debuglet controller processing devices. The breakpoint store may store the breakpoint condition generated by the debugger service and the active breakpoint information captured by the respective debuglet upon the physical breakpoint condition being hit. The terms "breakpoint hit" and "breakpoint condition hit" are used interchangeably and can mean that the corresponding breakpoint is executed and its condition is satisfied.

In some examples, the debuglet controller transmits a notification indicating the physical breakpoint condition being hit to the remaining debuglets that did not capture the active breakpoint information. The remaining debuglets may remove the physical breakpoint from the respective debuggee software process in response to the notification. In some examples, the debugger service receives the breakpoint request from an integrated development environment executing on a user computing device.

In some implementations, the debugger service includes a debugger application programming interface for setting a breakpoint, retrieving a breakpoint, deleting a breakpoint and listing breakpoints. The debuglet controller may include a debuglet controller application programming interface that enables the debuglets to register their respective debuggees, to query for active breakpoints to set, and to update active breakpoint information (e.g., when the breakpoint hits and fails). Receiving the request from one of the debuglets to update active breakpoint information may further include receiving breakpoint information (e.g., a call stack and/or variables) corresponding to the physical breakpoint condition being hit.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Developers debugging scalable network or web services are challenged to identify a specific software process related to a desired request and set a breakpoint on that specific process. As used herein the terms "software process" may simply be preferred to the term "process". This often requires the developers to resort to running a single process and directing network traffic or emulating the desired request with the specific process. As a result, processes execution context is interrupted during a debugging session and users' interaction with services running these processes on the scalable networks or web services is also interrupted. As used herein, the term "developer" will be used interchangeably with the term "user". Accordingly, the terms "developer" and "user" may refer to a client accessing a cloud computing platform using client devices, such as computing devices (e.g., desktop computers, laptops, tablets and smartphones). Applications or services on distributed systems, such as a cloud environment, do not require that the client have the specific software for running the applications or services, but instead enable the client to interact with the application or services using an internet connection and a user interface, such as a web browser. When the client corresponds to a developer, the developer may utilize an integrated development environment (IDE) user interface that provides a single software application including features such as a source code editor, build automation tools, and debuggers. Implementations of the present disclosure are directed toward providing a capability for the developer/user to access and debug one or more services operating on the cloud environment including, but not limited to, infrastructure as a service (IaaS), platform as a service (PaaS), and software as a service (SaaS), where IaaS is the most basic and each higher model abstracts from the details of the lower models. In contrast to the aforementioned conventional methods of identifying each specific process running on a service to be debugged, implementations herein are directed toward providing debugging as an application service whereat a collection of processes run by a corresponding service may be debugged as a single process to reduce or eliminate interruptions to the service's users and its processes being executed.

Figure 1:
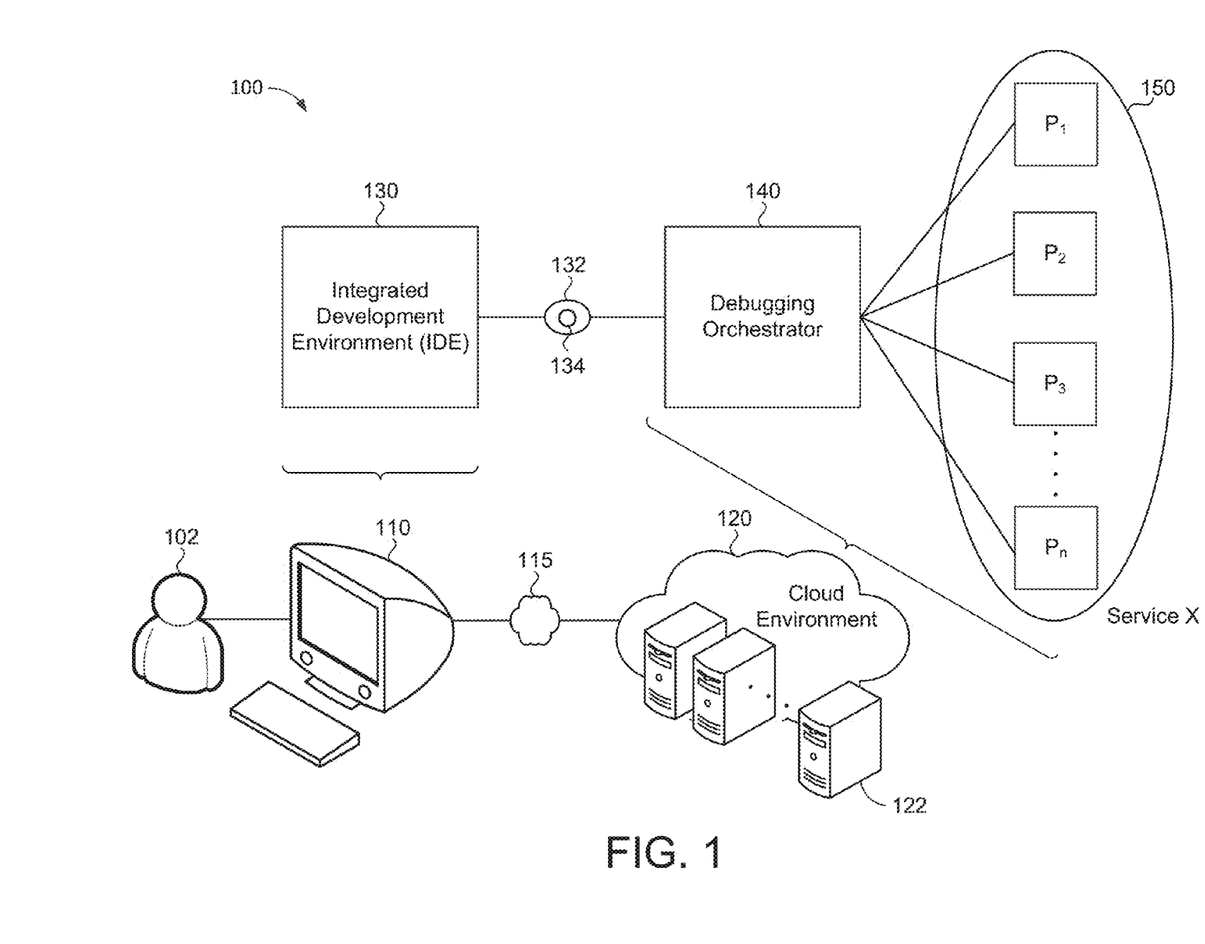
FIG. 1 is a schematic view of an example debugging environment, where a user uses a debugging orchestrator to request and set a breakpoint on each one of one or more processes running on a service.

Referring to FIG. 1, in some implementations, a debugging environment 100 includes a user 102 (e.g., a developer) interfacing with a computing device 110 (e.g., a computer, laptop, etc.) executing an IDE 130. The computing device 110 is in communication with a cloud computing environment 120 (i.e., cloud) via a network 115 to use a debugging orchestrator 140 executing in the cloud computing environment 120 to request and set a breakpoint on each one of a plurality of software processes $P_1, P_2, P_3, \ldots P_n$ running on a service 150.

The cloud 120 provides elastic/scalable cloud computing and/or cloud storage capabilities. Cloud computing may provide Internet-based computing, whereby shared servers 122 provide resources, software, and data to computers and other devices on demand. For example, the cloud 120 may be a cloud computing service that includes at least one server computing device 122, which may include a service abstraction layer and a hypertext transfer protocol wrapper over a server virtual machine instantiated thereon. The server computing device 122 may be configured to parse HTTP requests and send HTTP responses. Cloud computing may be a technology that uses the Internet and central remote servers to maintain data and applications. Cloud computing can allow users 102 to access and use applications, such as the debugging orchestrator 140, without installation and access personal files at any computer with internet access. Cloud computing allows for relatively more efficient computing by centralizing storage, memory, processing and bandwidth. The cloud 120 can provide scalable, on-demand computing power, storage, and bandwidth, while reducing user hardware requirements (e.g., by freeing up CPU and memory usage).

Figure 2:
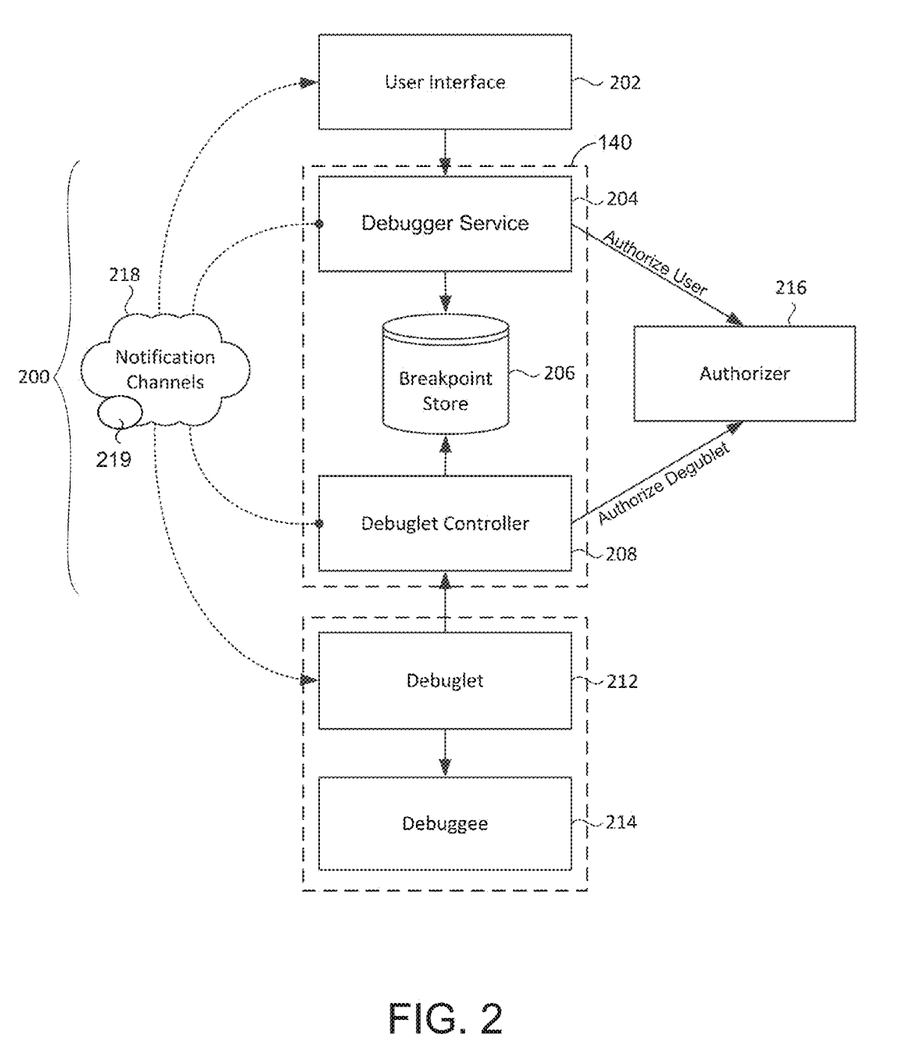
FIG. 2 is a schematic view of example components of a cloud debugger service.

In the example shown, Service X 150 corresponds to a debuggee indicating a service 150 that the user 102 desires to debug. The user 102 may need access rights to debug the service 150 and each of its processes $P_{1-n}$. As used herein, the term "debuggee" may refer to a user service being debugged or as a target service. However, the term "debuggee" does not refer to any one specific software process (i.e., "process"), but instead refers to a collection of processes $P_{1-n}$ running on the service 150 to fulfill the same function. Service X 150 executes the plurality of processes $P_{1-n}$ that each run under a secure respective debuglet or debugger agent 212 (FIG. 2). Service X 150 may execute in any operating platform or environment as part of a distributed system. Examples of operating platforms or environments that can run Service X 150 may include infrastructure as a service (IaaS) (e.g., GOOGLE COMPUTE ENGINE™ (GCE) using raw virtual machines), platform as a service (PaaS) (e.g., GOOGLE-APP ENGINE™ (GCE)), and software as a service (SaaS). In some implementations, the distributed system may include a cloud environment whereat one or more of different computing devices are executing the software processes $P_{1-n}$ executed by the service 150.

In some implementations, the user 102 (through the computing device 110) sets a conditional breakpoint using the IDE 130 to implement debugging of the service 150. As used herein, the term "breakpoint" refers to a point in software code where the execution context of the debuggee is sampled, and the sample itself. A breakpoint will not stop the debuggee process execution, but rather resumes the process execution as soon as the execution context is sampled. In some implementations, the conditional breakpoint set by the user 102 may be associated with a capture list including the desired code run by service 150 to be debugged. The IDE 130 sends a breakpoint request 132 for a breakpoint 134 to the debugging orchestrator 140 (hereinafter "orchestrator 140"). In some implementations, the orchestrator 140 may correspond to a cloud debugger service executed by one or more remote servers 122 (i.e., cloud debugger servers) that orchestrates debugging functionality between the user 102 and one or more debugees 150 (e.g., a service 150, such as Service X, executing on resources of a cloud environment 120). Details of the cloud debugger service architecture, and an example implementation thereof, are described below with reference to the exemplary implementations of FIGS. 2 and 4, respectively. The orchestrator 140 generally indicates a "debugger" that refers to a service that enables the user 102 (e.g., clients/developers) to set and retrieve breakpoint information from one or more debugees. As used herein the term "breakpoint information" collectively refers to a call stack and memory state (e.g., local variables, objects) within the breakpoint.

The orchestrator 140 may include a set of Application Programming Interfaces (APIs) that allow any IDE 130 to communicate with the orchestrator 140 and the service processes $P_{1-n}$ (e.g., debuggee) being debugged. Each software processes $P_{1-n}$ runs alongside a respective debuglet 212. As used herein, the term "debuglet" refers to a respective debugger agent running alongside each respective debugee process $P_n$ for executing actions such as setting and retrieving breakpoints between the orchestrator 140 and the respective debugee process $P_n$.

The orchestrator 140 publishes the breakpoint request 132 from the IDE 130 to all the debuglets 212 running with each software processes $P_{1-n}$. The debuglets 212 subsequently set the breakpoint 134 on each of the processes $P_{1-n}$ of the service 150. When the set breakpoint 134 is hit by one of the processes $P_{1-n}$, the respective debuglet 212 captures information corresponding to the breakpoint 134 and reports back to the orchestrator 140. The user 102 may be notified of the hit breakpoint 134 via a notification sent from the orchestrator 140 to the IDE 130. The orchestrator 140 may then cancel and disable the breakpoint 134 previously set on the other processes $P_n$ allowing these processes $P_{1-n}$ to never stop running. In some implementations, in the event of a race condition between the breakpoint 134 hitting on two or more processes $P_{1-n}$, the orchestrator 140 will ignore the later captured information received by any secondary debuglets 212 respective to processes $P_{1-n}$ that also hit the breakpoint. In the illustrated example, if the breakpoint 134 is hit by $P_1$, the orchestrator 140 will disable the breakpoint 134 from the other processes $P_2$-$P_n$. In this example, debugging capabilities of $P_1$ are sent back to the IDE 130 from the orchestrator 140, wherein the IDE 130 enables the user 102 to examine breakpoint information (e.g., stack and variables) within the captured breakpoint 134 and then set a new breakpoint 134. Thereafter, the orchestrator 140 sets this new breakpoint 134 to all service processes $P_{1-n}$ and resumes process $P_1$. In some examples, process $P_3$ may hit the new breakpoint 134 whereat debugging capabilities of $P_3$ are sent back to the IDE 130 in the same manner described above with reference to $P_1$.

The example of FIG. 1 merely illustrates how the orchestrator 140, in association with the debuglets 212 running with each software processes $P_{1-n}$ in the service 150 (e.g., a job or Service X), may receive a breakpoint request 132 from the user 102 and publish that request 132 to all the debuglets 212. Using the breakpoint request 132 published by the orchestrator 140, the debuglets 212 may set the breakpoint 134 to all the processes $P_{1-n}$. In some implementations, each debuglet 212 is configured for different languages to support the respective software process on a specific operating platform or environment. Accordingly, debuglets 212 are language dependent and may correspond to their respective languages, whereat the orchestrator 140 supports at least a Java debuglet, a C++ debuglet and Python debuglet. Additionally, an open API may be provided to allow third parties to develop debuglets for other languages, such as Ruby, Scala or node.js Javascript. Language dependent debuglets 212 will be described in greater detail below with reference to FIG. 2.

FIG. 2 is a schematic view of example components of a cloud debugger service 200. The cloud debugger service 200 includes a debugger service 204 that receives the debugging information (e.g., breakpoint request 132) from a client user interface (UI) 202. The client user interface (UI) 202 is accessed through a computing device 110 corresponding to the user 102. The UI 202 is operative to gather debugging information for a specific code line having specific conditions. Implementations herein are directed toward the UI corresponding to any one of a distributed system (e.g., cloud environment 120), a traditional IDE as described above with reference to the IDE 130 of FIG. 1, or a simple command line interface. In some examples, the traditional IDE can include Eclipse.

In some implementations, the debugger service 204 includes Debugger API business logic to provide functionality for setting a breakpoint 134 ('SetBreakpoint'), retrieving a breakpoint 134 ('GetBreakpoint), deleting a breakpoint 134 ('DeleteBreakpoint), and listing breakpoints 134 ('ListBreakpoints). The following pseudo code illustrates one example of implementing the API business logic of the debugger service 204. Other implementations are possible as well.

```
Service debugger{
  // These functions manipulate the breakpoint resource.
  SetBreakpoint ( )
  GetBreakpoint ( )
```

DeleteBreakpoint ( )
ListBreakpoints ( )
// This function returns the list of debuggees, i.e.,
// services that the user has debugging rights to.
ListDebuggees ( )
}

The debugger service 204 further communicates an authorizer 216 to authorize access by the user 102 through verification that the user 120 has debugging rights on a debuggee project resource. For instance, the UI 202 may send a user identifier corresponding to the user 102 to the debugger service 204, wherein the debugger service 204 uses the user identifier to verify if the user 102 has debugging rights on the requested debuggee project resource. As used herein, the term "debuggee project resource" refers to a set of processes that run in a context of a specific service, environment, version and set of binaries/files. Also, as used herein, the term "debuggee project resource" is interchangeable with the term "debuggee." In other words, the set of processes refer to software that the user 102 desires to debug wherein the set of processes are executed by one or more computing devices over a distributed system (e.g., the cloud environment 120). In some implementations, the authorizer 216 provides an authorization authority for access control list (ACL) management, rather than the debugger service 204 including its own ACL which may become out of sync with other project ACLs managed elsewhere. d The debugger service 204 also communicates with a breakpoint store 206 that includes persistent (non-transitory) storage for debuggee and breakpoint resources. As used herein, the term "breakpoint resource" includes breakpoint information that may indicate: a breakpoint specification, such as source code location and breakpoint condition; breakpoint-collected information, such as call stack and local variables; and breakpoint state which is indicative of either one of active and final states. A new breakpoint 134 is created "active" with an immutable specification until it hits or fails. Upon a hit or fail, the breakpoint 134 transitions to the "final" state and the breakpoint-collected information is stored with the breakpoint resource in the breakpoint store 206. A breakpoint 134 in the final state is immutable again and never changes its data or state.

In some implementations, the breakpoint store 206 stores debuggee identifiers that are periodically registered by respective debuglets 212 and provides the debuggee identifiers when the UI 202 queries the debugger service 204 for the list of debuggees 214. In other implementations, the breakpoint store 206 stores breakpoints 134 created by the debugger service 204 based upon a selected debuggee identifier. In some implementations, the breakpoint store 206 stores an updated active breakpoint 134 upon being hit.

A debuglet controller 208 may include Debuglet Controller API business logic that enables debuglets 212 to register their respective debugees 214, to query for active breakpoints 134 to set, and to update breakpoints 134 back when the breakpoint 134 changes state (e.g., hits or fails). The debuglet controller 208 communicates with the breakpoint store 206, the authorizer 216, and one or more debuglets 212. The debuglet controller 208 may further transmit notifications to the UI 202, via notification channels 218, indicating that a set breakpoint 134 was hit by one of the software processes $P_{1-n}$ of the debuggee 214. The debuglet controller 208 authorizes a debuggee service account access via the authorizer 216 by verifying that the debuglet 212 has debuggee rights to the debuggee project resource. In some implementations, the API business logic of the debuglet controller 208 may be implemented by the following pseudo code.

Service DebugletController{
// Publishes the debuggee and that its ready for debugging.
RegisterDebuggee( )
// These functions enable the debuglet to get 'work' and
// update 'results'
ListActiveBreakpoints( )
UpdateActiveBreakpoint( )
}

The debugging orchestrator 140 may include the debugger service 204, the breakpoint store 206, and the debuglet controller 208.

The debuglet 212 implements the actual debugger functionality corresponding to the debuggee 150, 214. In some implementations, the debuglet 212 translates the breakpoint resource to a specific language and executable being debugged (e.g., translate file:line to address to set breakpoint). In additional implementations, the debuglet 212 further translates back a call stack once a breakpoint 134 is hit by the debuggee 214 (e.g., translate call stack addresses back to file:line). As set forth in disclosure above with reference to FIG. 1, a debuglet 212 runs in very close proximity to a respective debuggee software processes $P_{1-n}$ being debugged within the cloud environment 120, which may include part of the same process or attached to the debuggee process. In some implementations, the debuglet 212 shares the same service account as the debuggee 214 for communicating with the debuglet controller 208.

Some implementations are directed toward each debuglet 212 being configured differently for different languages and different operating environments and platforms. For instance, each debuglet 212 may run on a distributed system 120 (e.g., cloud environment) of one or more different platforms, while the respective software process $P_n$ is in any programming language. Exemplary programming languages can include: Java™, Python or C++. For example, a Java debuglet 212 runs as a java-agent within a java virtual machine and is capable of establishing all the information needed for registration within the debuglet controller 208 from its operating environment or platform. In some implementations, the Java debuglet 212 can be implemented using the following pseudo code for capturing a set breakpoint 134 at the respective debuggee 214.

010 the application under debug is running
    020 request for a breakpoint arrives (with file:line information and condition)
    030 the java agent already knows how to map this file:line to module (it has a map of all modules)
    040 the agent compiles a small program to evaluate the condition at the breakpoint location; program C
    050 the agent inserts a breakpoint instruction to the application using the JVM
    060 the agent waits for the breakpoint to hit
    070 the breakpoint hits in the application; the application thread stops running; the agent is notified
    080 the agent executes program C to evaluate the condition; using JVM
    090 if the condition is false; resume the application and go to 060
    100 the agent query JVM for all the variables and objects and capture those that are mutable; takes reference to immutable values
    110 resume the application
    120 the agent copies the immutable values and releases the references
    130 the agent formats the data into string representing the captured data
    140 the agent sends the response back to the requester.

In the implementation of the pseudo code listed above for the Java debuglet 212, lines 070-110 indicate a period of time where the software process thread momentarily (e.g., a short-period of time) stops running. This short-period of time is described in further detail below with reference to the example operations in diagram 300 of FIG. 3.

The C++ debuglet 212, on the other hand, is complicated by a need for symbol files. Symbols files are large and require additional resources to read and process them. Accordingly, the C++ debuglet 212 may include an assist task that converts breakpoint information back and forth for the debuglet 212. For instance, the assist task may convert the file:line breakpoint location to an address in the debugged process $P_n$. The symbol assist may use an external symbol server to retrieve correct symbol files. In some implementations, the C++ debuglet 212 runs as a process alongside the respective debuggee process $P_n$ and uses ptrace to attach and monitor that process $P_n$. The C++ debuglet can be implemented using the following pseudo code for capturing a set breakpoint 134 at the respective debuggee 214.

010 the application under debug is running
020 request for a breakpoint arrives (with file:line information and condition)
030 the agent loads the symbolic information for that line from the symbol file.
040 the agent calculates the local variables available and loads the type information needed for the capture
050 all required info is loaded
060 the agent compiles a small program to evaluate the condition at the breakpoint location; program C
070 the agent compiles a small program that knows how to capture the expected information; program V
080 the agent inserts a breakpoint instruction to the application (without stopping it)
090 the agent waits for the breakpoint to hit
100 the breakpoint hits in the application; the application thread stops running; the agent is notified
110 the agent executes program C to evaluate the condition
120 if the condition is false; resume the application and go to 090
130 the agent executes program V; and captures the required data
140 resume the application
150 the agent looks up the symbolic information as how to format the captured data
160 the agent formats the data into string representing the captured data
170 the agent sends the response back to the requester.

In the pseudo code listed above for the C++ debuglet 212, lines 100-140 indicate a short-period of time where the process thread momentarily stops running. This short-period of time is described in further detail below with reference to the non-limiting example operations in diagram 300 of FIG. 3.

The debuglet controller 208 and the debugger service 204 may operate in a passive manner. The notification channels 218 are operative to reduce the user visible latency from the breakpoint 134 to result. In other words, the notification channels 218 allows the client/user 102 to listen for a notification that a breakpoint 134 was hit, rather than poll the server for results. The notification channels 218 may also reduce the load on the debuglet controller 208 and the debuglet 212. For example, a large number of debuglets 212 may not be required to poll the server 122 for work just to find out that nothing has changed, but rather, the debuglets 212 may wait for a notification indicating new work. Accordingly, the debugger service 204 and the debuglet controller 208 use the notification channels 218 to publish breakpoint events that may be learned by subscribers to optimize their access to the debugger services. A notification message 219 is configured to include just enough data to hint the subscriber of what action to take. In some implementations, a notification message 219 can be implemented using the following pseudo code.

Message notification{
// Identifies the debuggee this notification is about.
String debuggee_id;
// Identifies the breakpoint this notification is about.
String breakpoint_id;
// The event this notification is about. the event can be
// one of: NEW, UPDATE, DELETE, FINAL
String event;
}

Once the notification 219 is received, the subscriber can call one of the debugger services 204 to find more information about the breakpoint 134. For instance, the user 102 via the UI 202 can subscribe to UPDATE events in order to update the UI 202 with a new active breakpoint state, or FINAL events to get the breakpoint results. The debuglet 212 can subscribe to the NEW events to set a new breakpoint 134 to the debuggee 214, or FINAL/DELETE events to clear an already set breakpoint 134.

A service owner may decide which set of software processes $P_{1-n}$ are part of the same debuggee 214. Each debuggee 214 includes a globally unique identifier across all debugees 214 and may include any arbitrary value. The debuggee 214 is bound to a project, which is the authorization resource identifier that includes the source context. The authorization resource identifier enables the user 102 to identify the set of source code files associated with the debuggee executed software processes $P_{1-n}$. Once a debuggee 214 has been published it is deemed available for breakpoint information collection. The debuggee 214 and the breakpoint resource 134 may be stored in the breakpoint store 206.

In some implementations, the cloud debugger service 200 includes an architecture that enables scaling by the number of individual (software) processes $P_{1-n}$ being debugged over the distributed system 120. For instance, the number of debugged processes $P_{1-n}$ may be very high even though the number of users 102 who are actively debugging at the same time is low. Moreover, the cloud debugger service 200 may selectively store debug information in a database for later retrieval.

Figure 3:
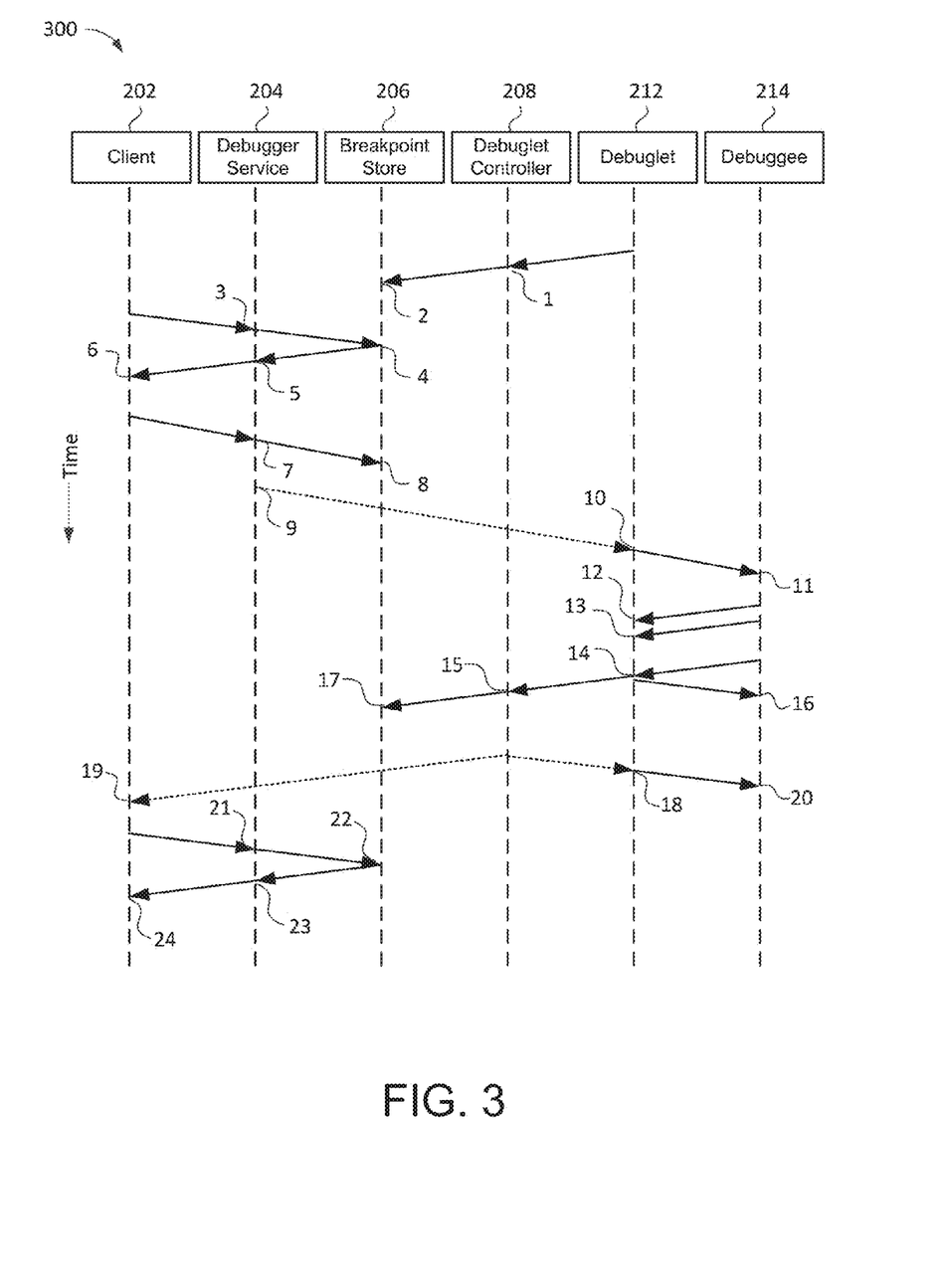
FIG. 3 is a schematic view of example operations performed by a cloud debugger service during a life of a breakpoint.

FIG. 3 is a diagram 300 illustrating example operations performed by the cloud debugger service 200 during a life of a breakpoint 134. The vertical y-axis indicates time increasing from the top to the bottom. At time 1, each debuglet 212 registers its respective debuggee 214 with the debuglet controller 208. At time 2, the debuglet controller 208 stores the debuggee information in the breakpoint store 206 and is enabled to receive set breakpoints 134 for retrieval.

Exemplary implementations of the present disclosure include the life of a breakpoint 134 starting with the user 102 (via the UI 202) browsing through source code and selecting a line of that code. At time 3, the debugger service 204 receives a query from the UI 202 for a list of debuggees 214 and uses the list to pick a desired debuggee identifier. At time 4, the debugger service 204 searches the breakpoint store 206 for the desired debuggee identifier expressed in the request. The desired debuggee identifier corresponds to a service Pn the user 102 desires to debug (e.g., a debuggee 214). At time 5, the debugger service 204 receives the desired debuggee identifier from the breakpoint store 206; and at time 6, the UI 202 receives the desired debuggee identifier from the debugger service 204. The UI 202 uses the debuggee identifier to request to set a breakpoint condition 134. At time 7, the debugger service 204 receives the request 132 to set the breakpoint condition 134 and the debuggee identifier from the UI 202. The debugger service 204 authorizes (e.g., via the authorizer 216) the calling user 102 against the debuggee project, generates the set breakpoint condition 134 and stores the breakpoint information corresponding to the set breakpoint condition 134 at the breakpoint store 206 at time 8. Subsequently, the debugger service 204 transmits a notification 219 at time 9, that is received by all debuglets 212 of the service at time 10, indicating that a new breakpoint condition 134 was generated.

Based upon the notification indicating that the new breakpoint condition was created, the debuglets 212 translate the generated breakpoint condition 134 to a physical breakpoint 134 that is set it to their respective debuggee processes $P_{1-n}$ at time 11. Times 12 and 13 indicate the physical breakpoint being evaluated several times by each debuglet 212 until the physical breakpoint 134 hits at time 14, whereat the debuglet 212 captures active breakpoint information corresponding to the active physical breakpoint 134 that was hit. At time 16, all the debuggee processes $P_{1-n}$ resume execution. Thus, between times 11 and 14, the debuggee process $P_n$ is momentarily stopped for a short-period of time to capture the active breakpoint information.

At time 15, the debuglet controller 208 receives a request from the debuglet 212 to update the active breakpoint information that was captured by the debuglet 212 (e.g., active breakpoint update request), and after the debuglet controller 208 authorizes the debuglet 212 against the debuggee process $P_n$ (e.g., registered project), the debuglet controller 208 stores the active breakpoint information at the breakpoint store 206 at time 17 and transmits a notification 219 received by the UI 202 at time 19 indicating the active physical breakpoint 134. All other debuglets 212 of the same debuggee 214 receive this notification at time 18 and remove the physical breakpoint 134 from their respective debuggee processes $P_{1-n}$ at time 20.

Based upon the notification 219 received from the debuglet controller 208 sent via notification channels 218, the UI 202 requests the debugger service 204 to retrieve the active breakpoint information, which is received by the debugger service 204 at time 21. After the debugger service 204 authorizes the user identifier, the active breakpoint information is retrieved from the breakpoint store 206 at time 22 and returned to the debugger service 204 at time 23 and the UI 202 at time 24. Here, the user 102 can command the process $P_n$ to resume in some implementations, or stop execution of the process $P_n$ entirely to explore more.

The implementations provided by the example operations in diagram 300 of FIG. 3 illustrate that the running debuggee process 214 does not stop for a prolong amount of time for the user 102 to examine its state, but rather defines the runtime context elements to capture ahead of time, before the breakpoint 134 is actually hit. Once the breakpoint condition 134 hits, the debuglet 212 captures the predefined state and resumes the debuggee 214 execution. Accordingly, the capture happens while the process Pn is stopped during a short time-frame appropriate to the service 214 being debugged. For instance, the debuggee process $P_n$ is only momentarily stopped between times 11 and 14 until the active breakpoint 134 that hit is captured. Thus, performance degradation of the debuggee 214 is reduced due to the non-stopping breakpoint 134, e.g., a watchpoint, only interrupting the debuggee 214 for the short time-frame while the capture takes place and is then immediately removed.

In some implementations, the capture context of the watchpoint 134 is computed ahead of time. Here, when the user 102 (e.g., developer) sets the watchpoint line, the debugger service 204 already knows to compute the variables to capture as well as how to capture the stack, whereat the debuglets 212 perform this computation differently for different programming language, or any other context the user desired to capture. This is done without interrupting the running debuggee process $P_n$. The debuglet 212 may set a breakpoint 134 to the debuggee process $P_n$ while associating the capture list with the breakpoint 134, and once the breakpoint 134 hits, the debuglet 212 captures and evaluates the condition first. If the condition is true, the debuglet 212 executes the capture list with only a limited variable buffer, and then resumes the debuggee 214. Once the debuggee 214 is resumed, the debuglet 212 formats the captured values, which might include looking up symbols, or formatting data into representable format (e.g., strings and trees) and returns the data to the user 102. In some implementations, the capture is done without any external communication at the time of the capture (except debuglet 212 to debuggee 214, which is language dependent). In some implementations, a further optimization can include the debuglet 212 to opt not to capture values that are immutable (such as strings in Java™), and just take a reference at capture time, whereat the copy of the actual value can happen after the process/thread is resumed.

Generally, traditional debuggers are used as a personal tool or as a tool shared by a small group. Once a developer debugs a process, no other developer can debug the same process at the same time, and thus, all other users become merely spectators of the debug session. The cloud debugger service 200 enables multiple developers to debug and share debug results from a single process or multiple jobs. Here, the debugger service 204 accepts debug requests from one or more developers 102 and routes them to the appropriate debuglets 212 via the debuglet controller 208. Once results become available, the debugger service 204 picks the results up from the debuglets 212 and returns it to the requesting developer 102 via the UI 202 associated with the debug request 132. Accordingly, multiple developers 102 are enabled by the cloud debugger service 200 to send requests 132 to a single process $P_n$ or job at the same time. Every debug request 132 includes its own identity allowing users 102 to exchange those identities (e.g., over URL) to view the same results. In some implementations, the debugger service API enables developers 102 to use their favorite debugging tool to connect to that service for debugging, rather than limiting the developers to one tool.

Figure 4:
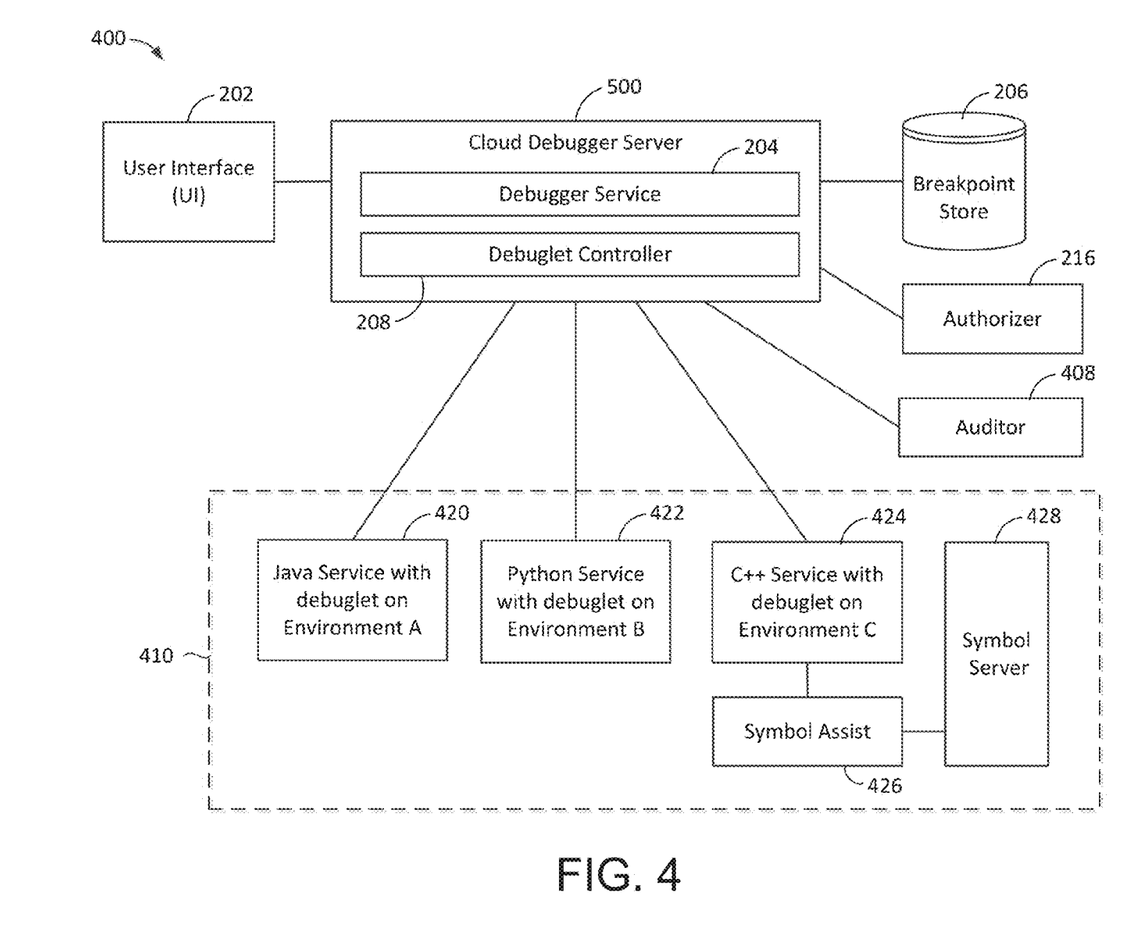
FIG. 4 is a schematic view of an example cloud debugger service.
Figure 5:
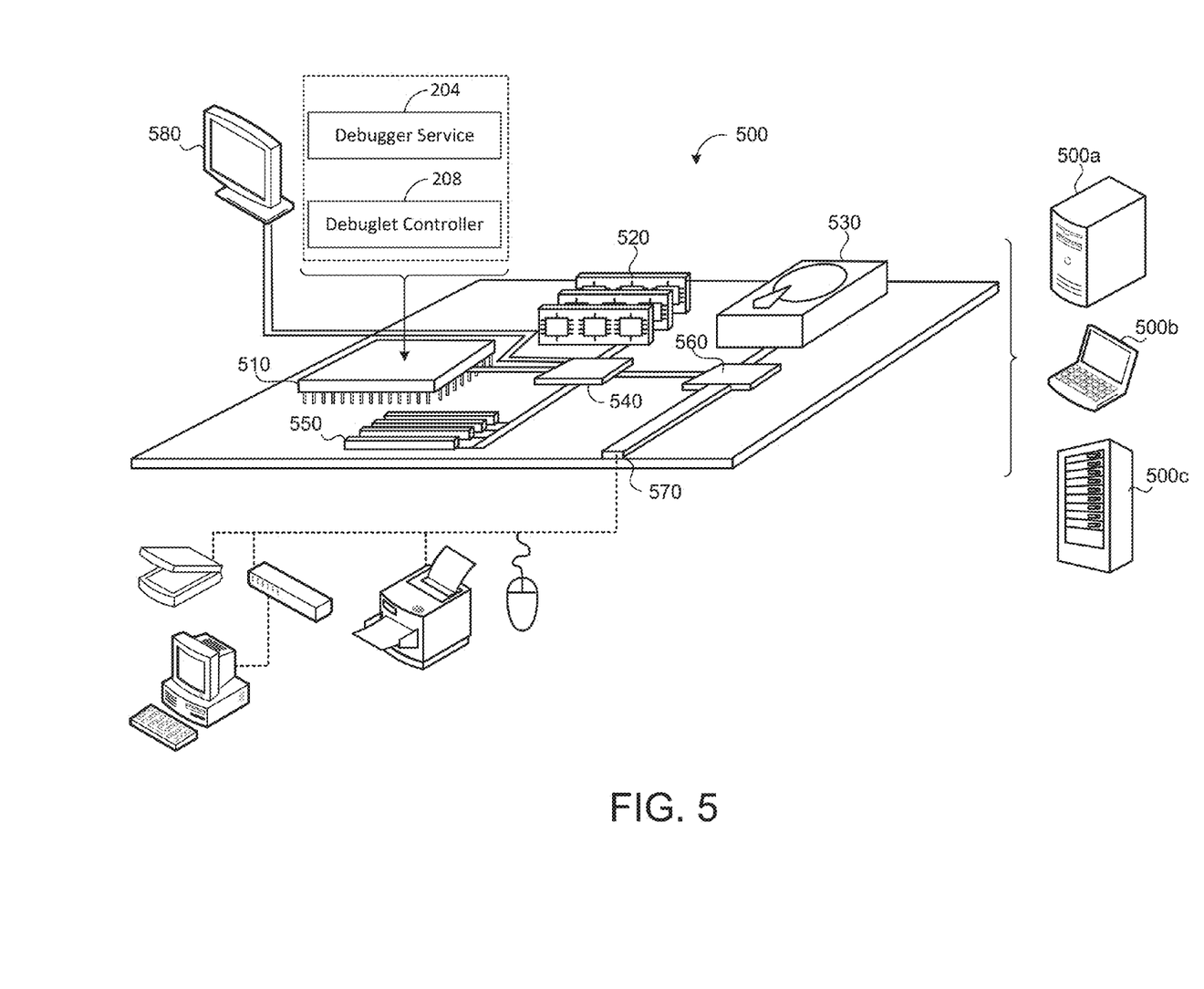
FIG. 5 is a schematic view of an example cloud debugger server of FIG. 4.

FIG. 4 is a block diagram of another example implementation of a cloud debugger service 400. The cloud debugger service 400 includes a user interface (UI) 202, a cloud debugger server 500 executing the debuglet controller 208, a breakpoint store 206, an authorizer 216, an auditor 408, and a distributed system 410. The UI 202 may include a client IDE in some implementations, such as Eclipse or IntelliJ, running on a computing device corresponding to the user which may connect to the cloud debugger server 500 over the internet.

The cloud debugger server 500 includes at least one processing device for executing the debugger service 204 and the debuglet controller 208. Components of the cloud debugger server 500 are described in further detail with reference to the processing device 500 shown in FIG. 5.

In some implementations, the breakpoint store 206 is external to the cloud debugger server 500. In other implementations, the breakpoint store 206 is integrated within the cloud debugger server 500. The auditor 408 is utilized for auditing the user 102 setting the breakpoint 134, the user 102 retrieving the breakpoint 134 with potential PII, and the debuglet 212 updating the breakpoint information.

The distributed system 410 may be the cloud environment 120. The distributed system 410 may include processing and storage devices 122. The distributed system 410 may be executed by one or multiple computing devices over the internet. In some implementations, the distributed system 120 includes services 420, 422, and 424 that may be debugged by the cloud debugger service 200. Thus, services 420, 422, and 422 are indicative of debugees 214 and each includes one or more running software processes $P_{1-n}$. The services 420, 422, and 424 may all include different software programming languages. Service 420 indicates a Java™ Service with a respective debuglet 212 on environment A. For instance, environment A may correspond to the GOOGLE APPLICATION ENGINE™ (GAE). Service 422 indicates a Python™ Service with a respective debuglet on Environment B. For instance, environment B may correspond to the GOOGLE COMPUTE ENGINE™ (GCE). Service 424 indicates the C++ service with a respective debuglet on environment C. For instance, environment C may correspond to a supervisory platform that orchestrates multiple cloud computing environments. In some implementations, service 424 utilizes a symbol assist 426 for converting breakpoint information back and forth for the debuglet 212. The symbol assist 426 may retrieve appropriate symbols from a symbol server 428. In some implementations, the symbol server may be maintained by the cloud debugger service 200.

FIG. 5 is schematic view of an example computing device 500 that may be used to implement the systems and methods described in this document, such as the computing device 110, the cloud debugger server 500 and the cloud debugger service 200. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processing device 510 (i.e., processor), memory 520, a storage device 530, a high-speed interface/controller 540 connecting to the memory 520 and high-speed expansion ports 550, and a low speed interface/controller 560 connecting to low speed bus 570 and storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/ erasable programmable read-only memory (EPROM)/electronically erasable programmable read-only memory (EEPROM) (e.g., typically used for firmware, such as boot programs), phase change memory (PCM) as well as disks or tapes. Examples of volatile memory include, but are not limited to, random access memory (RAM), dynamic random access memory (DRAM), or static random access memory (SRAM).

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and low-speed expansion port 570. The low-speed expansion port 570, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

In some implementations, the server 500 may further include the breakpoint store 206 (e.g., in the memory 520). The processing device 510 executes the debugger service 204 and the debuglet controller 208. For example, the debugger service 204 (executing on the processing device 510) may receive the breakpoint request from a computing device 110 corresponding to a user/developer 102, generate the breakpoint condition 134, notify the new breakpoint condition to the debuglets 212, and store the breakpoint condition 134 at the breakpoint store 206. The debugger service 204 may further retrieve a list of registered debuglets 212 from the breakpoint store 206 and provide the list to the user 102. In another example, the debuglet controller 208 of the processing device 510 may receive a request from one of the debuglets 212 to update active breakpoint information captured by the debuglet 212 upon a physical breakpoint condition being hit by one of the software processes $P_{1-n}$ of the distributed service 150. The debuglet controller 208 may further transmit a notification 219 indicating the physical breakpoint condition 134 being hit to the computing device 110 corresponding to the user 102 and to each of the debuglets 212, such that the user 102 can analyze the active breakpoint condition and the remaining debuglets 212 can cancel the physical breakpoint 134.

The storage device 530 of the cloud debugger server 500 may provide mass storage for the processing device 510. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations.

The communication device 510 may facilitate communication between the cloud debugger server 500 and each user 102 via the UI 202, the distributed system 410 and the breakpoint store 206. The communication device 510 may further communicate with the authorizer 216 and the auditor 408.

Figure 6:
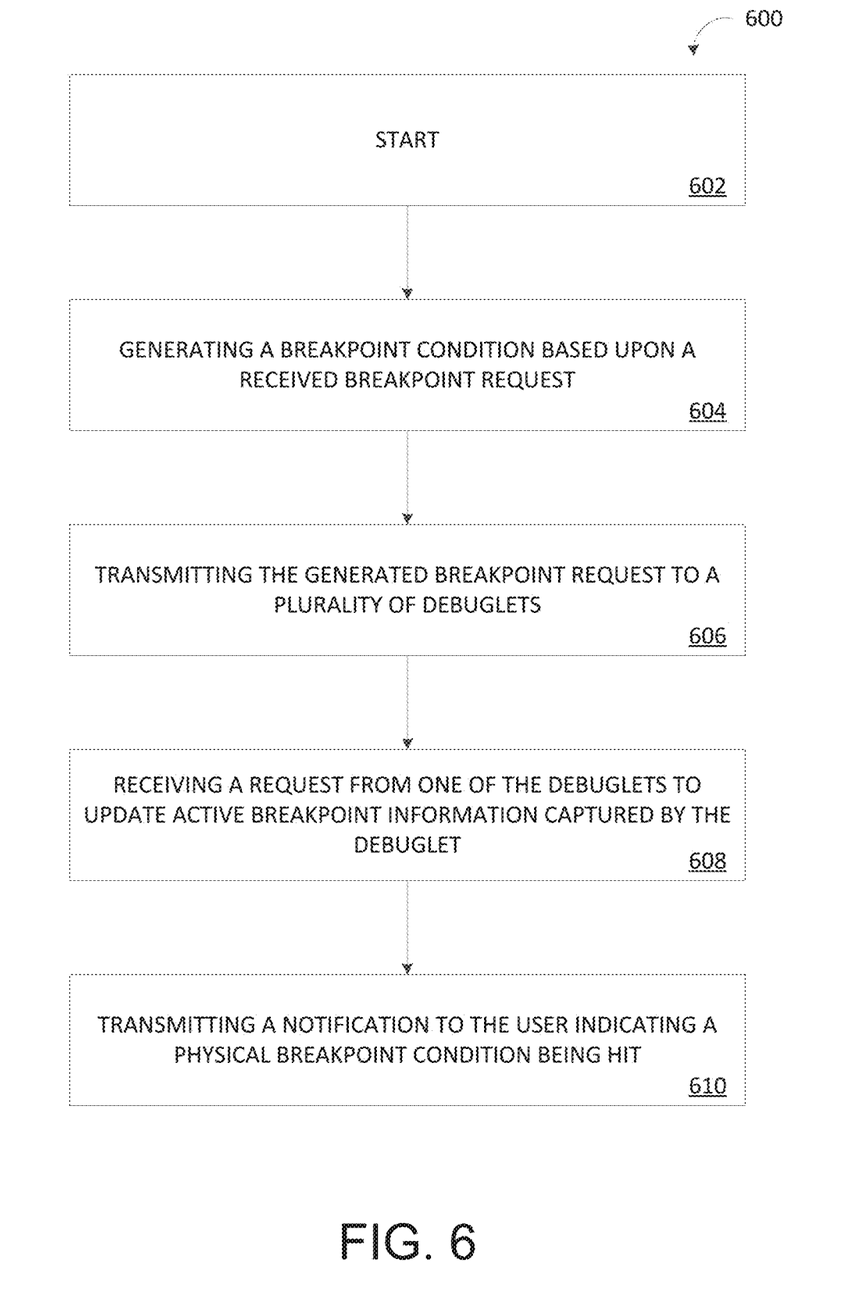
FIG. 6 is a flowchart of an example method for capturing a breakpoint condition from a debuggee software process.

FIG. 6 is a flowchart of an example method 600 executed by the processing device 510 of the cloud debugger server 500 of FIG. 5 for capturing a breakpoint condition from a debuggee software process $P_n$. The method 600 starts at operation 602 where a list of debuggees 214 registered by the debuglet controller 208 are stored at the breakpoint store 206, as illustrated in FIG. 3 between times 1 and 2. At operation 604, the debugger service 204 generates a breakpoint condition 134 based upon a breakpoint request 132 received from a computing device 110 corresponding to a user, as illustrated in FIG. 3 between times 2 and 7. The breakpoint store 206 may store the generated breakpoint condition 134.

At operation 606, the debugger service 204 transmits the generated breakpoint condition 134 to a plurality of debuglets 212, each respective to corresponding ones of software processes $P_{1-n}$ executed by the debuggee 214, as illustrated in FIG. 3 between times 9 and 10. The software processes $P_{1-n}$ can be executed by the debuggee services 150, 214, 420, 422, 424 (FIGS. 1-4). Specifically, each debuglet 212 is operative to translate the generated breakpoint condition 134 to a physical breakpoint condition 134 set to the respective software process $P_n$, as illustrated between times 10 and 11 of the diagram 300 of FIG. 3. For example, each debuglet 212 is dependent upon the programming language of its respective software process $P_n$, whereat each debuglet 212 may translate the generated breakpoint condition 134 to the specific programming language and executable associated with the respective software process $P_n$.

At operation 608, the debuglet controller 208 receives a request 219 from one of the debuglets 212 to update active breakpoint information captured by the debuglet 212 upon the physical breakpoint condition 134 being hit by one of the software processes $P_{1-n}$ as illustrated in the diagram 300 of FIG. 3, between times 11 and 15. For example, the active breakpoint information may include a call stack corresponding to the physical breakpoint condition 134 being hit, wherein the call stack is translated by one of the debuglets 212 prior to being received at the processing device (e.g. at the debuglet controller 208). Moreover, the debuglet controller 208 stores the active breakpoint information at the breakpoint store 206, as illustrated at time 17 in the diagram 300 of FIG. 3.

At operation 610, the debuglet controller 208 transmits a notification 219 to the computing device 110 corresponding to the user via the 202, as illustrated in the diagram 300 of FIG. 3, at time 19. The notification 219 indicates the physical breakpoint condition 134 being hit when the update active breakpoint information is received. Here, the user 102 via the UI 202 of the computing device 110 may request the processing device 510 to retrieve active breakpoint information from the breakpoint store 206 in response to the notification 219, as illustrated in the diagram 300 of FIG. 3, between times 21 and 24. In some implementations, the debuglet controller 208 transmits the notification to remaining debuglets 212 that did not capture the active breakpoint information, as illustrated in the diagram 300 of FIG. 3, at time 18. Here, the remaining debuglets 212 may remove the physical breakpoint condition 134 from the respective debuggee software processes $P_{1-n}$, as illustrated in the diagram 300 of FIG. 3, at time 20.

Examplary implementations are directed towards minimizing the amount of changes made by the debuglets 212 to the debugger process memory and state (e.g., by minimizing the amount of writes to the debuggee memory by the debuglet 212 and minimizing the amount of code executed in the debugger process $P_n$ on behalf of the debuglet 212) to reduce the risk of a bug or malformed request causing the debuggee process $P_n$ to change its execution or process injected data. In some implementations, debuglets 212 run using the same account as the debuggee 214, thus do not require the debuggee 214 to enable other accounts access to its processes $P_{1-n}$. In some implementations, debuglets 212 do not open incoming ports for communication with the debuglet controller 208, but rather use only outgoing connection to a well-known endpoint (the debuglet controller). In some implementations, the cloud debugger server 500 performs an authorization check on all requests, thus reducing the debuggee DoS attack surface.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g. the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for capturing breakpoint information from a debuggee software process, the method comprising:
receiving, at a processing device, a breakpoint request from a user computing device in communication with the processing device;
generating, by the processing device, a new breakpoint condition based upon the breakpoint request received from the user computing device, the new breakpoint condition identifying a point in software code run by a debuggee service executing a collection of software processes on a distributed system;
transmitting the new breakpoint condition from the processing device to debuglets of the debuggee service, each debuglet associated with a respective one of the software processes and in communication with the processing device, the new breakpoint condition causing each debuglet to translate the new breakpoint condition to a physical breakpoint condition set to the respective software process;
when one of the software processes hits the physical breakpoint condition:
receiving, at the processing device, a request from the debuglet associated with the software process that hit the physical breakpoint condition to update active breakpoint information captured by the associated debuglet; and
transmitting a notification indicating the hit physical breakpoint condition to the user computing device and each debuglet of the debuggee service, the notification causing the debuglets to remove the previously set physical breakpoint condition from their respective software processes.

2. The method of claim 1, further comprising:
prior to generating the breakpoint condition based upon the breakpoint request:
receiving, at the processing device, a user identifier included with the breakpoint request; and
authorizing, at the processing device, user access rights to capture the active breakpoint information from the debuggee software processes using the user identifier.

3. The method of claim 1, wherein only execution of the respective software process that hit the physical breakpoint condition is stopped for only a period of time sufficient for the respective debuglet to capture the active breakpoint information.

4. The method of claim 3, wherein execution of the respective software process is immediately resumed after the active breakpoint information is captured.

5. The method of claim 1, wherein each debuglet translates the generated breakpoint condition to a specific programming language and executable with the associated respective software process.

6. The method of claim 1, wherein each of the debuglets are dependent upon a programming language of their respective software process.

7. The method of claim 1, wherein receiving the request from one of the debuglets to update active breakpoint information further comprises receiving breakpoint information corresponding to the hit physical breakpoint condition.

8. The method of claim 7, wherein one of the debuglets translates the breakpoint information prior to transmittance to the processing device.

9. The method of claim 1, further comprising storing the breakpoint condition and the captured active breakpoint information in non-transitory memory.

10. A distributed system comprising:
one or more debugger service processing devices executing a debugger service, the debugger service generating a new breakpoint condition based upon a breakpoint request received from a user computing device in communication with the distributed system and corresponding to a user, the new breakpoint condition identifying a point in software code run by a debuggee service executing a collection of software processes; and
one or more debuglet controller processing devices in communication with the one or more debugger service processing devices and executing a debuglet controller, the debuglet controller:
transmitting the generated new breakpoint condition to debuglets of the debuggee service, each debuglet associated with a respective one of the software processes, the new breakpoint condition causing each debuglet to translate the new breakpoint condition to a physical breakpoint condition set to the respective software process;
when one of the software processes hits the physical breakpoint condition:
receiving a request from the debuglet associated with the software process that hit the physical breakpoint condition to update active breakpoint information captured by the associated debuglet; and
transmitting a notification indicating the hit physical breakpoint condition to the user computing device and each debuglet of the debuggee service, the notification causing the debuglets to remove the previously set physical breakpoint condition from their respective software processes.

11. The system of claim 10, wherein the debuglet controller stops execution of only the respective software process that hit the physical breakpoint condition only for a period of time sufficient for the respective debuglet to capture the active breakpoint information.

12. The system of claim 11, wherein the debuglet controller resumes execution of the respective software process immediately after the active breakpoint information is captured.

13. The system of claim 10, wherein, prior to generating the breakpoint condition, the debugger service:
receives a user identifier included with the breakpoint request; and
authorizes user access rights to capture the active breakpoint information from the debuggee software processes using the user identifier.

14. The system of claim 10, further comprising a breakpoint store in communication with the one or more debugger service processing devices and the one or more debuglet controller processing devices, the breakpoint store storing the new breakpoint condition generated by the debugger service and the active breakpoint information captured by the respective debuglet upon the physical breakpoint condition being hit.

15. The system of claim 10, wherein the debugger service receives the breakpoint request from an integrated development environment executing on the user computing device.

16. The system of claim 10, wherein the debugger service includes a debugger application programming interface for setting a breakpoint, retrieving a breakpoint, deleting a breakpoint, and listing breakpoints.

17. The system of claim 10, wherein the debuglet controller includes a debuglet controller application programming interface that enables the debuglets to register their respective debuggees, query for active breakpoints to set, and update active breakpoint information.

18. The system of claim 10, wherein receiving the request from one of the debuglets to update active breakpoint information further comprises receiving breakpoint information corresponding to the hit physical breakpoint condition.

* * * * *